May 24, 1938. H. A. BERGERT 2,118,755
PROCESS AND APPARATUS FOR MOUNTING CRANKPINS AND THE LIKE
Filed March 29, 1937
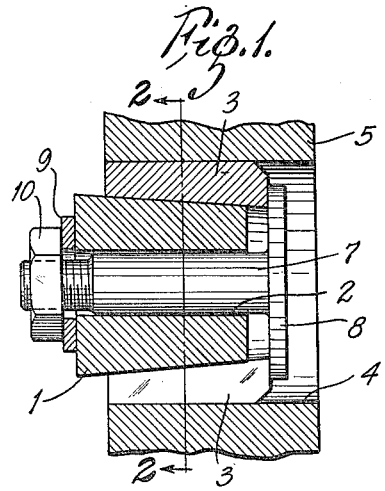
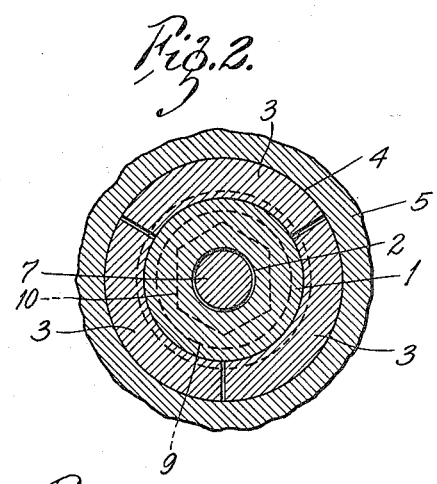
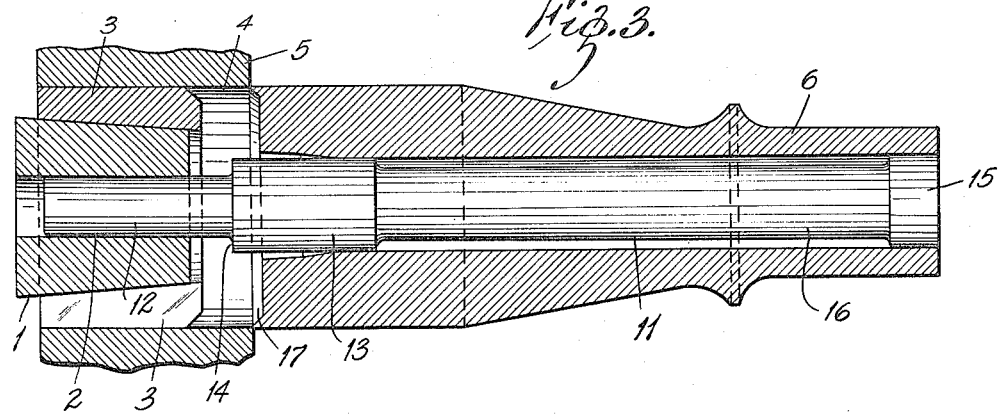
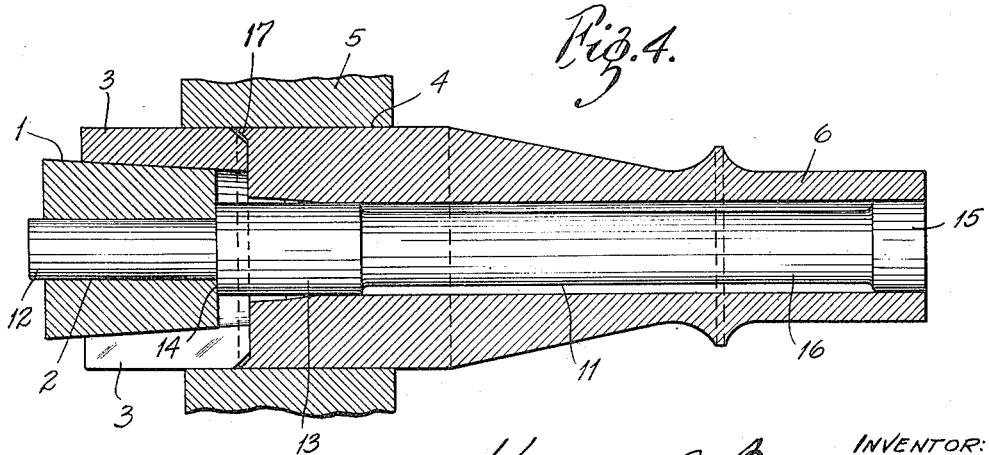
INVENTOR:
HIS ATTORNEYS.

Patented May 24, 1938

2,118,755

UNITED STATES PATENT OFFICE 2,118,755

PROCESS AND APPARATUS FOR MOUNTING CRANKPINS AND THE LIKE

Henry A. Bergert, Canton, Ohio, assignor to The Timken Roller Bearing Company, Canton, Ohio, a corporation of Ohio Application March 29, 1937, Serial No. 133,527

3 Claims. (Cl. 29—89)

On account of the weight of a locomotive crank pin and the need for mounting it in correct position and with a heavy press fit, such pin must be accurately centered and alined with relation to its seat before the heavy seating pressure is applied thereto, as inaccuracy in centering or alining while the pressure is being applied is liable to result in injury to the pin or to the pin seat. The principal object of the present invention is to devise a process and an apparatus which will assure the correct centering, alinement and mounting of the pin. The invention consists in the process and in the apparatus hereinafter described and claimed.

In the accompanying drawing wherein like reference numerals refer to like parts wherever they occur, Fig. 1 is a fragmentary sectional view through a wheel or other part, showing the expanding element of my apparatus mounted in the pin receiving bore of said wheel;

Fig. 2 is a cross section on the line 2—2 in Fig. 1;

Fig. 3 is a view similar to Fig. 1, showing the wedge operating bolt removed from the bore of the wedge, the pilot bar supported in said bore and the crank pin mounted on said bar in position to be pressed into said bore; and Fig. 4 is a similar view showing said crank pin entered into said bore.

My apparatus comprises a conical block 1, hereinafter called a wedge cone, with an axial cylindrical bore 2 and with an outer surface having a slow taper. Surrounding this wedge cone are a number of sector-shaped sections 3 arranged in a circular series. The outer surfaces of these sections are cylindrical and of the same radius of curvature as the bore 4 of the wheel 5 or other part in which the crank pin 6 or the like is to be mounted. The inner surfaces of these sections are conical and of a size and taper to fit the outer surface of the wedge cone 1.

Another element of the apparatus is a bolt 7 of a diameter somewhat less than the bore of the wedge cone and of such length that, in the starting position of the wedge cone and sections, the bolt will extend through and beyond the large end of the wedge cone while the head 8 of the bolt abuts against the thick ends of said sections. The projecting end of the bolt is threaded and provided with a washer 9 and a threaded nut 10.

Another element of my apparatus is a pilot bar 11 which comprises a cylindrical end portion 12, hereinafter called the forward end portion, of a size to make a close sliding fit in the bore of the wedge cone, and a thicker cylindrical portion 13 next to said forward end portion and of a diameter to make a sliding fit in the bore of the crank pin, thus forming a shoulder 14 between said cylindrical portions. The rear end portion of the bar has a cylindrical rib 15 of a diameter to make a sliding fit in the bore of the crank pin. The portions 16 of the bar between the fitting portions are preferably reduced in diameter to minimize friction. The bore of the crank pin is of cylindrical form for the greater portion of its length but widens in conical form at the larger end of said pin, as shown at 17. The portion 13 of the pilot bar adjacent to such tapered portion 17 in the course of mounting the pin is preferably enough wider than said tapered portion to maintain contact between the pin 6 and said portion 13 of the pilot bar during the operation of mounting the pin in its seat.

The operation of mounting a locomotive crank pin or the like is as follows: First, the wedge cone together with the sector-shaped sections are placed in the bore or pin seat of the wheel or mounting piece with the wedge cone tapering toward the point from which the crank pin is to be entered, the ends of said cone and sectors being spaced inwardly some distance from the end of the pin seat. The bolt is then passed through the bore of the wedge cone until its head bears against the thick ends of the loosely assembled sector shaped members. A washer is then slipped over the projecting end of the bolt and then a nut is placed on the threaded end and tightened up to effect relative longitudinal movement of the wedge cone. The effect of this longitudinal movement is to effectively wedge said sector-shaped members into tight frictional engagement with the pin seat in the wheel and with the wedge cone, whereupon the nut is backed off and the bolt is removed. In this position, the bore of the wedge cone is accurately centered and alined with relation to the pin seat.

The rear end of the pilot bar is then entered into the bore of the crank pin through the enlarged end of said bore, leaving the cylindrical forward end portion of said pilot bar projecting from said bore. While (or before, if desired) the pilot bar is thus mounted in the crank pin, the forward end portion of said pilot bar is entered into the bore of the wedge cone and slid along the same for a considerable distance. In this position, the pilot bar is accurately centered and alined with relation to the axis of the pin seat due to the close fitting of the end of the pilot bar in the bore of the wedge cone. In this position, the crank pin is also accurately centered and alined with relation to the bore of the wedge cone by reason of the bore of said crank pin closely fitting the pilot bar at the widely spaced cylindrical portions thereof.

With the crank pin thus accurately centered and alined, pressure is applied axially to the end of the crank pin and the pilot bar therein with the result that the pin is entered into its seat with great precision. As the inward movement of the pin and pilot bar continue, the shoulder of the bar bears against the small end of the wedge cone and moves said cone endwise, whereby the radial pressure on the sector-shaped sections is released and said sectors are unlocked from their frictional engagement with the pin seat. As the inward movement of the crank pin continues further, the end thereof bears against the thick end of said sectors and drives said sectors longitudinally ahead of it, the pilot bar shoulder at the same time continuing to move the wedge cone. Thus, the apparatus continues to function to some advantage even while it is being dismounted. After the wedge cone and sectors are removed, the pilot bar is readily withdrawn from the crank pin.

While I have described certain portions of my apparatus as cylindrical, it is obvious that the periphery of such portions need not be continuously circular, but may be grooved longitudinally provided that sufficient points of contact are left in a circular section for the purpose of centering.

While my apparatus is especially useful in mounting locomotive crank pins, it is not limited to such use, but is adaptable for mounting other hollow pin-like members where accurate centering and alinement are requisite, especially where such devices are heavy enough to be difficult to handle manually.

What I claim is:

1. Apparatus for use in mounting crank pins and the like, said apparatus comprising a conical wedge member with a cylindrical axial bore, arcuate sector-shaped members arranged in a circular series around said conical member with their inner surfaces fitting said wedge member and their outer surfaces adapted to frictionally grip the pin seat, and a pilot bar comprising a cylindrical end portion fitting the bore of said wedge member and a thicker portion fitting the bore of said pin.

2. Apparatus for use in mounting crank pins and the like, said apparatus comprising a conical wedge member with a cylindrical axial bore, arcuate sector-shaped members arranged in a circular series around said conical member with their inner surfaces fitting said wedge member and their outer surfaces adapted to frictionally fit the pin seat, means for relatively moving said conical and sector-shaped members to wedge them tight together and to the pin seat, and a pilot bar comprising a cylindrical end portion fitting the bore of said wedge member and a thicker cylindrical portion fitting the bore of said pin.

3. A device for mounting a hollow crank pin or the like in a bore, said device comprising a plurality of sectional sleeve members having a conical inner surface and an outer cylindrical surface concentric therewith, a hollow plug having a conical outer surface of the same taper as said sectional members and having a cylindrical axial guide bore, and a pilot pin having a cylindrical reduced end portion fitting said guide bore and having cylindrical pilot portions fitting the bore of said crank pin.

HENRY A. BERGERT.